United States Patent [19]

Koleske et al.

[11] Patent Number: 4,814,361
[45] Date of Patent: Mar. 21, 1989

[54] BLENDS OF EPOXIDES AND MONOEPOXIDES

[75] Inventors: Joseph V. Koleske, Charleston, W. Va.; Neil J. McCarthy, Jr., Brookfield, Conn.

[73] Assignee: Union Carbide Corporation, Danbury, Conn.

[21] Appl. No.: 902,780

[22] Filed: Sep. 2, 1986

Related U.S. Application Data

[62] Division of Ser. No. 464,558, Feb. 7, 1983, Pat. No. 4,622,349.

[51] Int. Cl.$^4$ ............... C08G 59/24; C08G 59/62; C08J 3/28
[52] U.S. Cl. ................. 522/170; 522/31; 522/77; 528/354; 528/361
[58] Field of Search .................. 522/31, 170

[56] References Cited

U.S. PATENT DOCUMENTS

| 3,042,686 | 7/1962 | O'Brien et al. |
| 3,341,484 | 9/1967 | Hoy |
| 3,444,111 | 5/1969 | Hickner |
| 3,912,690 | 10/1975 | Yapp ................. 528/274 |
| 3,936,557 | 2/1976 | Watt |
| 4,173,476 | 11/1979 | Smith et al. |
| 4,192,924 | 3/1980 | Crivello ................. 521/125 |
| 4,218,531 | 8/1980 | Carlson |
| 4,231,951 | 11/1980 | Smith et al. |
| 4,256,828 | 3/1981 | Smith |
| 4,261,871 | 4/1981 | Smith ................. 525/411 |

FOREIGN PATENT DOCUMENTS

| 916246 | 1/1963 | United Kingdom |
| 943925 | 12/1963 | United Kingdom |
| 991453 | 5/1965 | United Kingdom |

OTHER PUBLICATIONS

Handbook of Epoxy Resins, Henry Lee, 1967, McGraw-Hill, pp. 13-8, 13-9, 13-10, 13-24, and 13-25.

Primary Examiner—Lewis T. Jacobs
Assistant Examiner—Arthur H. Koeckert
Attorney, Agent, or Firm—Jean B. Mauro

[57] ABSTRACT

Described herein are compositions suitable for photocopolymerization comprising (a) an epoxide containing two or more epoxy groups, and (b) a hydroxyl substituted cycloaliphatic monoepoxide. The composition may additionally contain a poly (active hydrogen) organic compound and/or a photoinitiator. A coating produced from such a composition has a good combination of properties.

4 Claims, No Drawings

BLENDS OF EPOXIDES AND MONOEPOXIDES

This is a division of application Ser. No. 464,558, filed Feb. 7, 1983, now U.S. Pat. No. 4,622,349.

BACKGROUND OF THE INVENTION

Epoxides have gained wide acceptance in protective coatings in electrical and structural applications due to their exceptional combination of properties such as toughness, adhesion, chemical resistance, and superior electrical properties.

Epoxides may be cured by ultraviolet (UV) light or thermally. UV cure involves the use of a photoinitiator with the epoxide. When this system is radiated with ultraviolet light, the formulation is cured into a coating. Such a coating has an acceptable balance of properties. However, there is a desire to enhance selected properties of coatings based on epoxides.

Polyols are often combined with the epoxides in such systems to improve their properties. For example, when the polyols are of sufficient molecular weight, the flexibility of the epoxide coating is improved. However, such systems may not have good moisture resistance which makes them unsuitable for use in certain cured systems, i.e., coatings where such moisture resistance is required.

THE INVENTION

It has now been found that when a hydroxyl substituted cycloaliphatic monoepoxide is added to a photopolymerizable composition containing an epoxide which has two or more epoxy groups, the resulting coating has a good combination of properties.

Also, when the hydroxyl substituted cycloaliphatic monoepoxide is added to a photopolymerizable composition containing an epoxide which has two or more epoxy groups and a poly(active hydrogen) organic compound the resulting coating has improved moisture resistance.

The composition of this invention is suitable for photocopolymerization and comprises:
(a) an epoxide containing two or more epoxy groups, and
(b) a hydroxyl substituted cycloaliphatic monoepoxide.

The composition may optionally contain a poly(active hydrogen) organic compound and/or photoinitiator that generates a species capable of polymerizing epoxides when subjected to a radiation source.

The hydroxl substituted cycloaliphatic monoepoxide is preferably of the following formula:

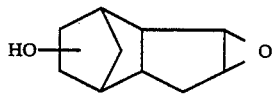

(I)

The hydroxy substituted cycloaliphatic epoxide of structure (I) is described in, for example, U.S. Pat. No. 3,280,152.

The hydroxyl substituted cycloaliphatic monoepoxide is used in amounts of from about 3 to about 70, preferably from about 5 to about 50 weight percent.

The epoxides which may be used herein contain two or more epoxy groups having the formula:

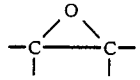

The epoxy groups can be terminal epoxy grops or internal epoxy groups. The epoxides are primarily cycloaliphatic epoxides. These cycloaliphatic epoxide resins may be blended with minor amounts of glycidyl type epoxides, aliphatic epoxides, epoxy cresol novolac resins, epoxy phenol novolac resins, polynuclear phenolglycidyl ether-derived resins, aromatic and heterocyclic glycidyl amine resins, hydantoin epoxy resins, and the like, and mixtures thereof. The cycloaliphatic epoxide resins may also be blended ith minor amounts of cycloaliphatic epoxides having a viscosity of less than 200 centipoise such as:

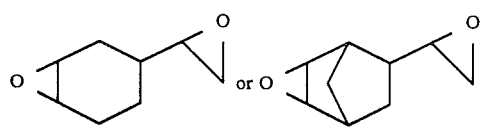

Further, such cycloaliphatic epoxides may be blended ith the cyclodipatic epoxides and other epoxides described above. These epoxides are well known in the art and many are commercially available.

Suitable cycloaliphatic epoxide resins for purposes of this invention are those having an average of two or more vicinal epoxy groups per molecule. Illustrative of suitable cycloaliphatic epoxides are the following:

FORMULA I

Diepoxides of cycloaliphatic esters of dicarboxylic acids having the formula:

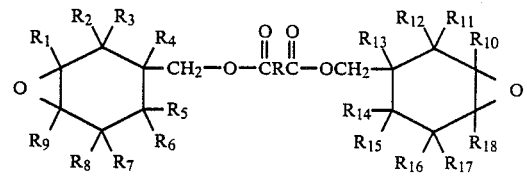

wherein $R_1$ through $R_{18}$, which can be the same or different, are hydrogen or alkyl radicals generally containing one to nine carbon atoms inclusive, and preferably containing one to three carbon atoms, inclusive, as for example methyl, ethyl, n-propyl, n-butyl, n-hexyl, 2-ethylhexyl, n-octyl, n-nonyl and the like; R is a valence bond or a divalent hydro carbon radical generally containing one to twenty carbon atoms, inclusive, and preferably, containing four to six carbon atoms, inclusive, as for example, alkylene radicals, such as trimethylene, tetramethylene, pentamethylene, hexamethylene, 2-ethylhexamethylene, octamethylene, nonamethylene, hexadecamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_{18}$ are hydrogen and R is alkylene containing four to six carbon atoms.

Among specific diepoxides of cycloaliphatic esters of dicarboxylic acids are the following:
bis(3,4-epoxycyclohexylmethyl)oxalate, bis(3,4-epoxycyclohexylmethyl)adipate,
bis(3,4-epoxy-6-methylcyclohexylmethyl)adipate,
bis(3,4-epoxycyclohexylmethyl)pimelate, and the like.

Other suitable compounds are described in, for example, U.S. Pat. No. 2,750,395.

FORMULA II

A 3,4-epoxycyclohexylmethyl-3,4-epoxycyclohexane carboxylate having the formula:

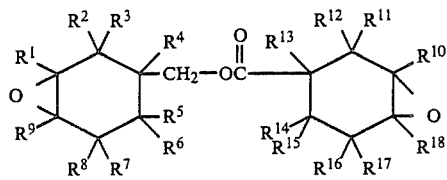

wherein $R^1$ and $R^{18}$ which can be the same or different are as defined for $R_1$ to $R^{18}$ in Formula I. Particularly desirable compounds are those wherein $R^1$ through $R^{18}$ are hydrogen.

Among specific compounds falling within the scope of Formula II are the following: 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate. Other suitable compounds are described in, for example, U.S. Pat. No. 2,890,194.

FORMULA III

Diepoxides having the formula:

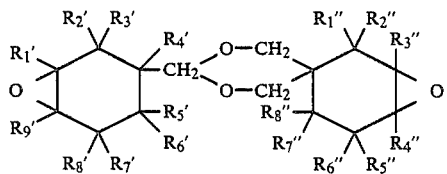

wherein the R single and double primes, which can be the same or different, are monovalent substituents such as hydrogen, halogen, i.e. chlorine, bromine, iodine or fluorine, or monovalent hydrocarbon radicals, or radicals as further defined in U.S. Pat. No. 3,318,822. Particularly, desirable compounds are those wherein all the R's are hydrogen.

Other suitable cycloaliphatic epoxides are the following:

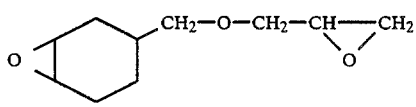

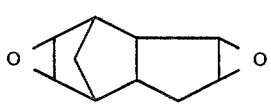

and the like.

The preferred cycloaliphatic epoxides are the following:

3,4-Epoxycyclohexylmethyl-3,4-Epoxycyclohexane carboxylate

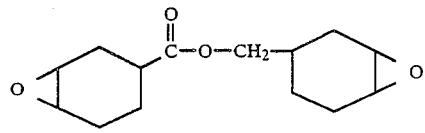

Bis(3,4-Epoxycyclohexylmethyl)adipate

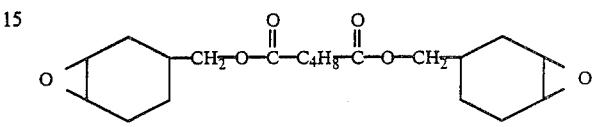

2-(3,4-Epoxycyclohexyl-5,5-spiro-3,4-epoxy)cyclohexane-meta-dioxane

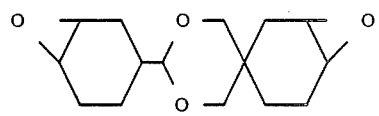

or mixtures thereof.

Epoxides with six membered ring structures may also be used, such as diglycidyl esters of phthalic acid, partially hydrogenated phthalic acid or fully hydrogenated phthalic acid. A representative diglycidyl ether or phthalic acid is the following:

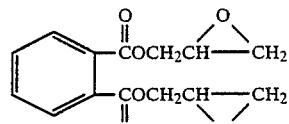

Diglycidyl esters of hexahydrophthalic acids being preferred.

The glycidyl-type epoxides are preferably diglycidyl ethers of bisphenol A which are derived from bisphenol A and epichlorohydrin and have the following formula:

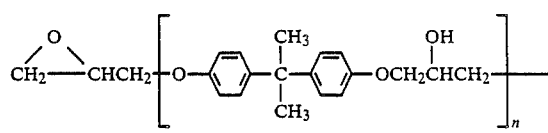

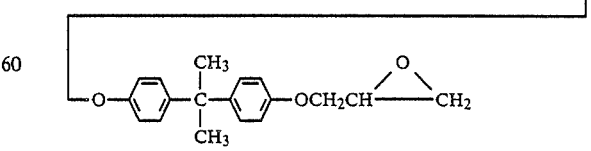

The cresol-novolac epoxy resins are multifunctional, solid polymers characterized by low ionic and hydrolyzable chlorine impurities, high chemical resistance, and thermal performance.

The epoxy phenol novolac resins are generally of the following formula:

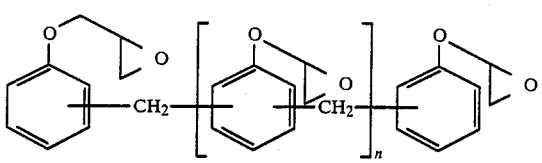

The polynuclear phenol-glycidyl ether-derived resins are generally of the formula:

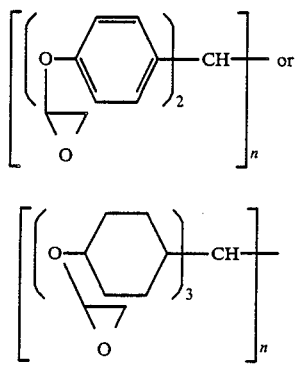

Among the aromatic and heterocyclic glycidyl amine resins which may be included herein are the following: tetraglycidylmethylenedianiline derived resins of the following formula:

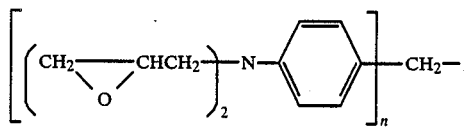

Triglycidyl-p-aminophenol derived resins, triazine based resins and hydantoin epoxy resins of the formula:

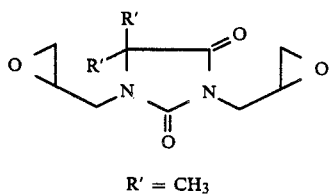

R' = CH₃

It is of course understood by those skilled in the art that when a photoinitiator is used only minor amounts of basic organic nitrogen containing epoxide compounds may be used so as not to interfere with the photocopolymerization reaction.

The poly(active hydrogen) organic compounds of this invention include any compatible organic compounds containing two or more active hydrogen atoms per molecule. The poly(active hydrogen) organic compounds are well known the those skilled in the art and include, for example, organic polyols and the like.

Substantially any of the organic polyols previously used in the art to make coating compositions can be used and are preferred as the poly(active hydrogen) organic compounds in this invention. Illustrative of the polyols useful in producing coating compositions in accordance with this invention are the polyether polyols such as polyhydroxyalkanes and polyoxyalkylene glycols, the acrylic and vinyl polyols, the polyester polyols, the polycaprolactone polyols, the polymer/polyols, and the like. Among the polyether polyols which can be employed are those selected from one or more of the following classes of compositions, alone or in admixture, known to those skilled in the art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyether polyols. Ethylene oxide, 1,2-epoxypropane, the epoxybutanes, 3,-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes, and the like.

The polyether polyols described hereinabove can have the hydroxyl numbers which vary over a wide range. In general, the hydroxyl numbers of the above described polyols employed in this invention can range from about 20, and lower, to about 1200, and higher.

The hydroxyl number is defined as the number of milligrams of potassium hydroxide required for the complete neutralization of the fully phthalated derivative prepared from 1 gram of polyol. The hydroxyl number can also be defined by the equation:

$$OH = \frac{56.1 \times 1000 \times f}{m.w.}$$

where
OH=hydroxyl number of the polyol;
f=functionality, that is, average number of hydroxyl groups per molecule of polyol; and
m.w=molecular weight of the polyol.

The polyether polyols described hereinabove can be prepared by conventional methods and are commercially available from a number of manufacturers.

The polycaprolactone polyols, alone or in admixture, that can be used to prepare the coating compositions of this invention include any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene bis-cyclohexanol, xylenediol, 2-(4-hydroxymethylphenyl) ethanol, 1,4-butanediol, 1,6-hexanediol and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

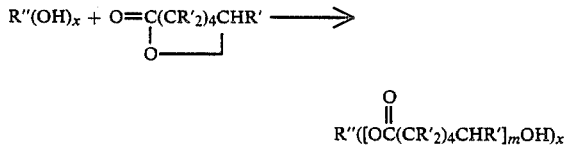

In this equation the organic functional initiator is the R''—(OH)$_x$ compound and the caprolactone is the

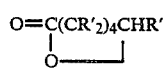

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 6,000, most preferably from about 290 to 3,000. The most preferred are the polycaprolactone diol compounds having an average molecular weight of from about 290 to about 1,500 and the polycaprolactone triol and tetrol compounds having an average molecular weight of from about 290 to about 2,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 8, preferably 2 to 4, hydroxyl groups.

Illustrative of polycaprolactone polyols that can be used in the coating compositions of this invention, one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

| POLYCAPROLACTONE POLYOLS | | |
|---|---|---|
| Initiator | Average MW of polyol | Average No. of CPL units in molecules |
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol(MW 200)* | 713 | 4.5 |
| 14 Polyethylene glycol(MW 600)* | 1,398 | 7 |
| 15 Polyethylene glycol(MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol(MW 425)* | 835 | 3.6 |
| 20 Polypropylene glycol(MW 1000)* | 1,684 | 6 |
| 21 Polypropylene glycol(MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamine | 890 | 6.5 |

POLYCAPROLACTONE POLYOLS -continued

| Initiator | Average MW of polyol | Average No. of CPL units in molecules |
|---|---|---|
| 33 Erythritol | 920 | 7 |
| 34 Pentaerythritol | 1,219 | 9.5 |
| 35 1,4-Butanediol | 546 | 4.0 |
| 36 Neopentyl glycol | 674 | 5.0 |

*Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

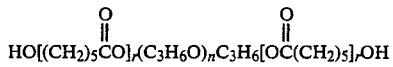

wherein the sum of r+r has an average value of 6 and the average molecular weight is 1,684. This explanation makes explicit the structural formulas of compounds 1 to 34 set forth above.

Polycaprolactone hexols suitable for use in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis (3,4-epoxycyclohexylmethyl) adipate, vinyl cyclohexane dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolactone triols to a molten state. Preferred polycaprolactone hexols suitable as ingredients in the coating compositions of this invention have an average molecular weight of from about 600 to about 1500.

The polymer/polyols that can be used to prepare the coating compositions of this invention are known materials. Such polymer/polyols can be produced by polymerizing one or more ethylenically unsaturated monomers dissolved or dispersed in a base polyol in the presence of a free radical catalyst. The production of polymer/polyols is more fully described in U.S. Pat. No. Re. 28,715, U.S. Pat. No. Re. 29,118, U.S. Pat. No. 3,652,639, U.S. Pat. No. Re. 29,014, U.S. Pat. No. 3,950,317, U.S. Pat. No. 4,208,314, U.S. Pat. No. 4,104,236, U.S. Pat. No. 4,172,825 and U.S. Pat. No. 4,198,488.

While poly(oxypropylene) polyols are preferred, substantially any of the polyols previously used in the art to make polymer/polyols can be used as the base polyol. Illustrative of the base polyols useful in producing polymer/polyol compositions are the polyether polyols such as polyhydroxyalkanes and polyoxyalkylene polyols, or the like. Among the base polyols which can be employed are those selected from one or more of the following classes of compositions, alone or in admixture, known to those skilled in the art and described more fully hereinabove:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts thereof of polyphenols;
(e) The polyols from natural oils such as castor oil, and the like.

The most preferred base polyols employed in the polymer/polyols which are useful as ingredients in the coating compositions of this invention include the poly(oxypropylene) polyols. It should be appreciated that a blend or mixture of more than one base polyol can be utilized, if desired, to form the polymer/polyol.

Conceptually, the monomers used in preparing the polymer/polyols can comprise any ethylenically unsaturated monomer or monomers. A variety of monomers are disclosed in the patents relating to polymer/polyols previously referred to. The selection of the monomer or monomers used will depend on considerations such as the relative cost of the monomers and the product characteristics required for the intended application.

The preferred monomer and monomer mixture used to make the polymer portion of the polymer/polyols is acrylonitrile and a mixture of acrylonitrile and styrene respectively. The relative weight proportions of acrylonitrile to styrene can range from about 80:20 to about 20:80. It may be desirable in some applications to utilize, with acrylonitrile, a comonomer other than styrene. Representative examples of suitable comonomers include methyl methacrylate, vinyl chloride and vinylidene chloride.

The polymer and polyol content of the polymer/polyols can vary within wide limits, depending upon the requirements of the anticipated end use application. In general, the polymer content will vary from about 10 to about 50 percent, based upon the weight of the polymer/polyol. The polyol content of the polymer/polyols varies from about 50 to about 90 percent, based upon the weight of the polymer/polyol.

The polymer/polyols may, if desired, be blended with other conventional polyols described hereinabove to reduce the polymer content to the level desirable for the particular end use application. Blends in which the resulting polymer content is as low as 4 percent of the total weight of the blend or even less may be useful in the coating compositions of this invention.

The most preferred classes of polyols employed in the coating compositions of this invention are the polycaprolactone polyols such as TONE-0200 and TONE-0300 commercially available from Union Carbide Corporation, the dihydroxyl functional polytetramethylene oxide polyols such as Polymeg 650, 1000 and 2000 commercially available from Quaker Oats Company, the polymer/polyols such as NIAX Polymer Polyol 31-23 and 34-28 commercially available from Union Carbide Corporation, and of course the ethylene oxide and propylene oxide adducts including ethylene glycol, diethylene glycol, the poly(oxyethylene) glycols, the poly(oxypropylene) glycols, triols and higher functionality polyols such as LHT-67, LHT-112, and LG-56 commercially available from Union Carbide Corporation. A preferred alkylene oxide derived polyol suitable for use in the coating compositions of this invention has the following formula:

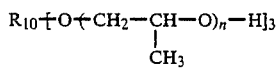

wherein $R_{10}$ is alkane of 3 to 10 carbon atoms, preferably 3 carbon atoms, and n is an integer of from about 10 to about 25. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, such as the propylene oxide polyols capped with ethylene oxide, i.e., NIAX Polyol 11-27 and 11-34 and E-474, commercially available from Union Carbide Corporation, or may be randomly distributed along the polymer chain. As is well known in the art, the polyols that are most preferred herein contain varying small amounts of unsaturation. Unsaturation in itself does not affect in any adverse way the formation of the coating compositions in accordance with the present invention.

Other preferred representative examples of organic polyols that may be employed in the coating compositions of this invention include copolymers of hydroxypropyl and hydroxyethyl acrylates and methacrylates with other free radical-polymerizable monomers such as acrylate esters, vinyl halides, vinyl acetate or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters and hydroxy terminated polyalkadienes. The polyester polyols are the reaction products of polyfunctional organic carboxylic acids and polyhydric alcohols and include, for example, poly(hexamethylene adipate), poly(ethylene adipate), poly(butylene adipate) and the like. Many of these organic polyols can be prepared by conventional methods and are commercially available from a number of manufacturers such as polyvinylacetal resins commercially available from Monsanto Chemical Company as Butvar B-72A, B-73, B-76, B-90 and B-98 and as Formvar 7/10, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E; and a cellulose acetate butyrate ester having a hydroxyl equivalent weight of approximately 400 commercially available from Eastman Kodak as Alcohol Soluble Butyrate.

The poly(active hydrogen) organic compounds utilized in the coating compositions of this invention can be mixtures or blends of organic polyols. For example, when utilizing a polycaprolactone polyol, it may be desirable to mix or blend one or more of a propylene oxide polyol, a propylene oxide polyol capped with ethylene oxide, a polytetramethylene oxide polyol or a polymer/polyol therewith. Other mixtures or blends may similarly be used if desired. The concentration of the organic polyols in the compositions of this invention can range from 1 to 60 weight percent, preferably from 5 to 40 weight percent, and most preferably from 10 to 30 weight percent of the total weight of the coating composition. The ratio of the equivalent weight of epoxide to the total hydroxyl equivalent weight of organic polyol in the coating compositions of this invention can range from about 120:1 to 1:1, preferably from 110:1 to 2:1 and most preferably from 100:1 to 3:1 depending upon the properties desired in the final coating composition.

The photoinitiators which may be used herein include one or more of a metal fluoroborate and a complex of boron trifluoride, as described in U.S. Pat. No. 3,379,653; a bis(perfluoroalkylsulfonyl)methane metal salt, as described in U.S. Pat. No. 3,586,616; an aryldiazonium compound, as described in U.S. Pat. No. 3,708,296; an aromatic onium salt of Group VIa elements, as described in U.S. Pat. No. 4,058,400; an aromatic onium salt of Group Va elements, as described in U.S. Pat. No. 4,069,055; a dicarbonyl cheleate of a Group IIIa–Va element, as described in U.S. Pat. No. 4,086,091; a thiopyrylium salt, as described in U.S. Pat. No. 4,139,655; a Group VIa element having an $MF_6^-$ anion where M is selected from P, As and Sb, as described in U.S. Pat. No. 4,161,478; a triarylsulfonium complex salt, as described in U.S. Pat. No. 4,231,951; and an aromatic iodonium complex salt and an aromatic sulfonium complex salt, as described in U.S. Pat. No. 4,256,828. Preferred photoinitiators include triarylsulfonium complex salts, aromatic sulfonium or iodonium salts of halogen-containing complex ions, and aromatic onium salts of Group IIIa, Va and VIa elements. Some of such salts are commercially available, such as FC-508 and FC-509 (available from Minnesota Mining and Manufacturing Company), and UVE-1014 (available from General Electric Company).

Preferred photoinitiators are described in U.S. patent application Ser. No. 464,570 filed in the name of J. V. Koleske et al, titled Photoinitiator-Diluent Mixtures, and filed on the same date as this application. Said application describes compositions comprising (a) a photoinitiator selected from diazonium salts or onium salts, or mixtures thereof, and (b) a cycloaliphatic epoxide.

The photoinitiators are used in conventional amounts in the compositions of this invention such as in amounts from about 0.1 to 30 parts by weight per 100 parts by weight of the epoxides.

The compositions herein may include additives such as oils, particularly silicone oil, surfactants such as silicone-alkylene oxide copolymers and acrylic polymers, such as the Modaflows (obtained from Monsanto Chemical Co.), silicone oil containing aliphatic epoxide groups, fluorocarbon surfactants; low molecular weight alcohols; cellosolves, such as butyl cellosolve; carbitols, such as butyl carbitol and diethyleneglycol, and the like.

The composition may include a reactive diluent which is a substituted cycloaliphatic monoepoxide. The substituted cycloaliphatic monoepoxide is substituted with alkyl of 1 to 9 carbon atoms, halogen, oxygen, ether, ester or vinyl radicals. Preferably, the substituted cycloaliphatic monoepoxide is vinyl substituted cycloaliphatic monoepoxide and is preferably selected from one or more of the following:

(1) 4-vinyl cyclohexane monoepoxide having the formula:

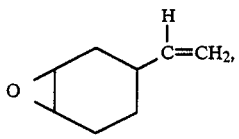

(2) norbornene monoepoxide having the formula:

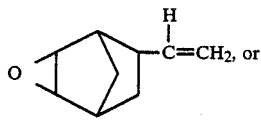

(3) limonene monoepoxide having the formula:

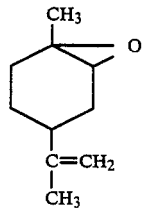

The substituted cycloaliphatic monoepoxide may be used in the composition in amounts of from about 0.1 to about 95, preferably from about 1 to about 60, and most preferably, from 3 to about 30 weight percent.

If desired, one may include in the compositions of this invention various conventional non-basic fillers (e.g., silica, talc, glass beads or bubbles, clays, powdered metal such as aluminum, silver, zinc oxide, etc.) and other additives such as rubbers, tackifying agents, pigments and the like.

The photocopolymerizable compositions are particularly suitable in a variety of applications in the fields of protective coatings and graphic arts due to their flexibility, impact resistance, abrasion-resistance, hardness and adhesion to rigid, resilient and flexible substrates such as metal, plastic, rubber, glass, paper, wood, and ceramics.

The photopolymerization of the compositions of the invention occurs upon exposure of the compositions to any source of radiation emitting actinic radiation at a wavelength within the ultraviolet and visible spectral regions. Suitable sources of radiation include mercury, xenon, carbon arc lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be photopolymerized by exposure to electron beam irradiation. Generally speaking the dosage necessary is from less than 1 megarad to 100 megarads or more.

The compositions of this invention may be prepared simply by mixing the formulation ingredients together, preferably under "safe light" conditions when the photoinitiator is incorporated.

EXAMPLES

The following Examples serve to give specific illustration of the practice of this invention but they are not intended in any way to act to limit the scope of this invention.

The following designations used in the Examples have the following meaning:

Epoxy 1: 3,4-epoxycyclohexylmethyl-3,4-epoxycyclohexane carboxylate.

Epoxy 2: Bis(3,4-epoxycyclohexylmethyl) adipate.

Polyol 1: A propylene oxide polyol having an average equivalent weight of 974 and an average hydroxyl number of 58.

Polyol 2: A polycaprolactone triol having an average molecular weight of 540 and an average hydroxyl number of 310.

Reactive Diluent: 4-Vinyl Cyclohexene Monoepoxide

Monoepoxide:

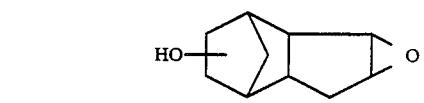

Surfactant 1: A silicone surfactant with the structure

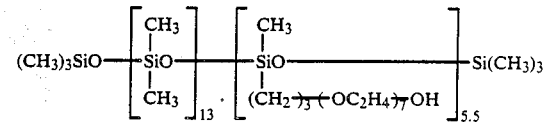

Surfactant 2: A fluorinated alkyl ester of the nonionic type and commercially available from 3M Commercial Chemicals Division as FC-171.

Photoinitiator 1: FC-508, a solution of a triarylsulfonium hexafluorophosphate with a specific gravity of 1.33 and a Brookfield viscosity of 40,000 to 60,000 centipoise (obtained from Minnesota Mining and Manufacturing Company).

Photoinitiator 2: UVE-1014, a solution of a triarylsulfonium hexafluoroantimony salt with a specific gravity of 1.39 and a Brookfield viscosity of 74 centipoise (obtained from General Electric Co.).

The procedures used to test coatings cured with the compositions of this invention were as follows:

Solvent Resistance (Double Acetone Rubs): a measure of the resistance of the cured film to attack by acetone in which a film coating surface was rubbed with an acetone soaked cheese cloth back and forth with hand pressure. A rub back and forth with hand pressure over the film coating surface with the acetone soaked cheesecloth was designated as one "double acetone rub". The effect that a certain number of double acetone rubs had on the film coating surface was reported by a number in parenthesis following the number of double acetone rubs. The rating system for evaluating acetone resistance for a given number of double acetone rubs was as follows:

Number in Parenthesis After Number of Rubs (1) No change in coating appearance.
(2) Scratched surface.
(3) Dulled, marred, some coating removed.
(4) Breaks in coating appearance.
(5) About one-half of the coating removed.

Pencil Hardness-ASTMD-3363-74

The rating system for pencil hardness was as follows:

6B-5B-4B-3B-2B-B-HB-F-H-2H-3H-4H-5H-6H
Softer                           Harder

Crosshatch adhesion—refers to a test using 10 parallel, single-edge, razor blades to scribe test films with 2 sets of perpendicular lines in a crosshatch process. Ratings are based on the amount of film removed after applying and subsequently pulling a contact adhesive tape (Scotch Brand 606) away from the surface of a scribed coating at a 90 degree angle in a fast, rapid movement. It is important to carefully apply and press the tape to the scribed coating to eliminate air bubbles and provide a good bond because adhesion is reported as the percent of film remaining on the substrate with a 100 percent rating indicating complete adhesion of the film in the substrate Reverse or face impact resistance—measures the ability of a given film to resist rupture from a falling weight. A Gardner Impact Tester using an eight-pound dart is used to test the films cast and cured on the steel panel. The dart is raised to a given height in inches and dropped onto the reverse or face side of a coated metal panel. The inches times pounds, designated inch-pounds, absorbed by the film without rupturing is recorded as the reverse or face impact resistance of the film.

Moisture Resistance—the cured film coating was immersed in water for a specified period of time and at a specified temperature. After removal from the water, the hydrolytic resistance of the cured film coating was determined by the pencil hardness test and the crosshatch adhesion test described hereinabove. Results obtained were compared with the results of identical tests performed on cured film coatings not immersed in water to determine moisture resistance.

EXAMPLES 1 TO 4 AND CONTROL A

These examples describe blends of epoxides, Monoepoxide, surfactant and photoinitiator in the amounts shown in Table I. The ingredients were placed in amber bottles under a yellow light source.

The systems were coated onto Bonderite 37 steel panels with a No. 20 wire-wound rod and cured with one pass (unless otherwise noted) under a 100 watt per inch medium pressure energy vapor UV light source at 30 feet per minute (fpm). The systems were aged at room temperature (about 25°) without a post cure and with a ten minute post cure at 160° C.

TABLE I

| Ingredient | Examples (Parts by weight) | | | | |
|---|---|---|---|---|---|
|  | Control A | 1 | 2 | 3 | 4 |
| Monoepoxide | 95.5 | 17.58 | 40.93 | 14.11 | 14.11 |
| Epoxy 1 | — | 77.92 | — | 62.57 | 62.57 |
| Epoxy 2 | — | — | 54.57 | 18.82 | 18.82 |
| Photoinitiator 1 | — | — | — | 4.0 | — |
| Photoinitiator 2 | 4.0 | 4.0 | 4.0 | — | 4.0 |
| Surfactant 1 | 0.5 | 0.5 | 0.5 | 0.5 | 0.5 |

All coatings except for obtained from Control A were tack free when warm immediately after UV exposure. Control A had a very little tack when cooled to room temperature (about 25° C.). It was tack free the next day. (Note the fact that the blend of Control A changed from a liquid to a solid which demonstrates that the Monoepoxide undergoes polymerization under the conditions employed.)

The properties of the coatings are shown in Tables II and III

TABLE II

| Properties | Examples (No Post Cure) | | | | |
|---|---|---|---|---|---|
|  | Control A | 1 | 2 | 3 | 4 |
| Double Acetone Rubs | 2(5) | 100(1) | 50(5) | 50(5) | 100(1) |
| Pencil Hardness | <5B | H | F | F | H |
| Crosshatch Adhesion (%) | 100 | 15* | 5* | 100 | 5* |
| Gardner Impact (in. lbs.) | | | | | |
| Face | 25 | 25 | 25 | 25 | 25 |
| Reverse | <5 | <5 | <5 | <5 | <5 |

*The coating were very brittle and shattered when the crosshatch adhesion test was run. This lead to the apparently low values of adhesion when the tape test was carried out.

TABLE III

| Properties | Examples (Post Cured 10 Minutes at 160° C. | | | | |
|---|---|---|---|---|---|
|  | Control A | 1 | 2 | 3 | 4 |
| Double Acetone Rubs | 2(5) | 100(1) | 35(5) | 40(4) | 100(1) |
| Pencil Hardness | 2B | 4B | H | H | H |
| Crosshatch Adhesion (%) | 100 | 100 | 100 | 100 | 100 |
| Gardner Impact (in. lbs.) | | | | | |
| Face | <5 | 25 | 15 | 15 | 25 |
| Reverse | <5 | <5 | <5 | <5 | <5 |

CONTROL B, EXAMPLES 5 TO 8

These Examples describe blends of Monoepoxide, epoxide, polyol and photinitiator in the amounts shown in Table IV. The ingredients were mixed as described in Examples 1 to 4 and coated onto Bonderite 37 steel panels and cured as described in Examples 1 to 4. The viscosity of the blends was measured at 25.1° C. with a Brookfield Viscometer. The results are shown in Table IV. Also, the epoxy/OH ratio is shown in Table IV.

TABLE IV

| Ingredients | Examples (parts by weight) | | | | |
|---|---|---|---|---|---|
|  | Control B | 5 | 6 | 7 | 8 |
| Monoepoxide | — | 5.00 | 10.00 | 15.00 | 20.00 |
| Epoxy 1 | 70.46 | 66.77 | 63.08 | 59.39 | 55.70 |
| Polyol 1 | 25.04 | 23.73 | 22.42 | 21.11 | 19.80 |
| Photoinitiator 2 | 4.00 | 4.00 | 4.00 | 4.00 | 4.00 |
| Surfactant 2 | 0.50 | 0.50 | 0.50 | 0.50 | 0.50 |

TABLE IV-continued

| Ingredients | Control B | 5 | 6 | 7 | 8 |
|---|---|---|---|---|---|
| Epoxy/OH Ratio | 20/1 | 9.5/1 | 6.3/1 | 4.7/1 | 3.7/1 |
| Viscosity | — | 520 | 520 | 530 | 544 |

The coatings were tack free when warm immediately after UV exposure. All had high gloss. The thickness of the coating was from 0.80 to 0.90 mils. The properties of the coating are shown in Tables V and VI.

TABLE V

Example (No Post Cure)

| Properties | Control B | 5 | 6 | 7 | 8 |
|---|---|---|---|---|---|
| Acetone Resistance* | | | | | |
| 3 hours | — | 100(1) | 100(3) | 100(3) | 90(3) |
| 1 day | — | 100(1) | 100(1) | 100(1) | 100(2) |
| 3 days | 25(5) | 100(1) | 100(1) | 100(1) | 100(1) |
| 7 days | — | 100(1) | 100(1) | 100(1) | 100(1) |
| Pencil Hardness | | | | | |
| 7 days | — | 2H | 2H | 2H | 2H |
| 3 days | HB | — | — | — | — |
| Crosshatch Adhesion (%) | | | | | |
| 7 days | 100 | 100 | 100 | 95 | 100 |
| Gardner Impact (in lbs.) | | | | | |
| Face, 3 days | >320 | 125 | 100 | 125 | 80 |
| Reverse, 3 days | >320 | 5 | 5 | 25 | 5 |

TABLE VI

Examples (Post Cured 10 minutes at 170° C.)

| Properties | Control B | 5 | 6 | 7 | 8 |
|---|---|---|---|---|---|
| Acetone Resistance* | | | | | |
| 3 hours | — | 100(1) | 100(1) | 100(1) | 100(1) |
| 1 day | — | 100(1) | 100(1) | 100(1) | 100(1) |
| 3 days | — | 100(1) | 100(1) | 100(1) | 100(1) |
| 7 days | — | 100(1) | 100(1) | 100(1) | 100(1) |
| Pencil Hardness 7 days | — | 2H | 2H | 2H | 2H |
| Crosshatch Adhesion (%) 7 days | — | 100 | 100 | 100 | 100 |
| Gardner Impact (in lbs.) | | | | | |
| Reverse, 7 days | — | 75 | 75 | 200 | 175 |
| Face, 3 days | — | 75 | 125 | 125 | 175 |
| Moisture Resistance | | | | | |
| Distilled Water (about 25° C.) | | | | | |
| Pencil Hardness 1 day | — | HB | HB | HB | HB |
| Crosshatch Adhesion (%) 1 day | — | 100 | 100 | 100 | 100 |
| 130° F. Distilled Water | | | | | |
| Pencil Hardness 4 hours | — | F | HB | F | F |
| Crosshatch Adhesion (%) 4 hours | — | 100 | 100 | 100 | 100 |

CONTROL C AND EXAMPLES 9 TO 12

These Examples describe blends of Monoepoxide, epoxide, polyol and photoinitiator in the amounts shown in Table VII. The ingredients were mixed as described in Examples 1 to 4 and coated onto Bonderite 37 steel panels and cured as described in Examples 1 to 4. The viscosity of the blends was measured at 25.1° C. with a Brookfield Viscometer. Also, the epoxy/OH ratio is shown in Table VII.

TABLE VII

| Ingredients | Control C | 9 | 10 | 11 | 12 |
|---|---|---|---|---|---|
| Monoepoxide | 0 | 5.00 | 10.00 | 15.00 | 20.00 |
| Epoxy 1 | 70.46 | 66.77 | 63.08 | 59.39 | 55.70 |
| Polyol 1 | 25.04 | 23.73 | 22.42 | 21.11 | 19.80 |
| Photoinitiator 1 | 4.00 | 4.00 | 4.00 | 4.00 | 4.00 |
| Surfactant 2 | 0.50 | 0.50 | 0.50 | 0.50 | 0.50 |
| Epoxy/OH Ratio | 20/1 | 9.5/1 | 6.3/1 | 4.7/1 | 3.7/1 |
| Viscosity | 586 | 660 | 666 | 664 | 685 |

DESCRIPTION OF THE COATED PENCIL

EXAMPLES 9-11

Slight tack when warm immediately after UV exposure—better than control. All were tack free when cooled to room temperature. The thickness of the coating was 0.8 mil

EXAMPLE 12

Tacky when warm immediately after UV exposure—about the same as the control. Tack free when cooled to room temperature. The thickness of the coating was 0.8 mil.

The properties of the coatings are shown in Tables VIII and IX.

TABLE VIII

Examples (No Post Cure)

| Properties | Control C | 9 | 10 | 11 | 12 |
|---|---|---|---|---|---|
| Acetone Resistance* | | | | | |
| 2 hours | 15(5) | 10(5) | 10(4) | 10(5) | 8(5) |
| 3 days | 25(5) | 20(4) | 15(4) | 15(4) | 10(4) |
| Pencil Hardness 3 days | HB | HB | HB | HB | 2B |
| Crosshatch Adhesion (%) 3 days | 100 | 100 | 100 | 100 | 100 |
| Gardner Impact, in lbs. | | | | | |
| Face, 3 days | >320 | >320 | >320 | 275 | 25 |
| Reverse, 3 days | >320 | >320 | >329 | 200 | <5 |
| Moisture Resistance | | | | | |
| Distilled Water (about 25° C.), 1 day | | | | | |
| Pencil Hardness | HB | 2B | 4B | 4B | 3B |
| % Crosshatch Adhesion (%) | 0 | 100 | 100 | 95 | 100 |
| 130° F. Water, 4 hours | | | | | |
| Pencil Hardness | HB** | HB | HB+ | HB+ | HB+ |
| Crosshatch Adhesion (%) | 40** | 100 | 95 | 75 | 100 |
| Moisture Resistance | | | | | |
| Distilled Water (about 25° C.), 13 days | | | | | |
| Pencil Hardness | — | 2B | 4B | B | 3B |
| Crosshatch Adhesion (%) | — | 100 | 100 | 100 | 100 |

**3 Hour values
+Slight yellowing of coating noticed.

TABLE IX

| Properties | Examples (Post Cured 10 minutes at 170° C.) | | | | |
|---|---|---|---|---|---|
| | Control C | 9 | 10 | 11 | 12 |
| Acetone Resistance 3 days | 50(3) | 20(4) | 15(4) | 15(4) | 15(4) |
| Pencil Hardness 3 days | H | HB | HB | HB | HB |
| Crosshatch Adhesion (%) 3 days | 100 | 100 | 100 | 100 | 100 |
| Gardner Impact, (in lbs.) | | | | | |
| Face, 3 days | 300 | 25 | 25 | 25 | 25 |
| Reverse, 3 days | >320 | <5 | <5 | <5 | <5 |
| Moisture Resistance | | | | | |
| Distilled Water (about 25° C.), 1 day | | | | | |
| Pencil Hardness | HB | 2B | 3B | 2B | HB |
| Crosshatch Adhesion (%) | 100 | 100 | 100 | 100 | 100 |
| 130° F. Water, 4 hours | | | | | |
| Pencil Hardness | HB** | HB | HB | HB | HB |
| Crosshatch Adhesion (%) | 100 | 100 | 100 | 100 | 100 |

**3 Hour values

EXAMPLES 13 TO 18

These Examples describe the combination of Monoepoxide and Reactive diluent and of these two compounds plus polyols and cycloaliphatic epoxides that contain surfactant and a photoinitiator in the amounts shown in Table X. The viscosity of the blends were measured at 25.1° C. in a Brookfield Viscometer. The ingredients were placed in amber bottles while working under a yellow light source.

The systems were coated onto Bonderite 37 steel panels and used as described in Examples 1 to 4.

TABLE X

| Ingredients | Example (parts by weight) | | | | | |
|---|---|---|---|---|---|---|
| | 13 | 14 | 15 | 16 | 17 | 18 |
| Monoepoxide | 13.23 | 13.23 | 8.27 | 8.27 | 8.27 | 8.27 |
| Reactive Diluent | 10.65 | 10.65 | 8.27 | 8.27 | 8.27 | 8.27 |
| Epoxy 1 | — | — | 58.26 | 58.26 | 54.91 | 54.91 |
| Polyol 1 | — | — | 20.70 | 20.70 | — | — |
| Polyol 2 | — | — | — | — | 25.04 | 24.05 |
| Photoinitiator 1 | 1.0 | — | 4.0 | — | 4.0 | — |
| Photoinitiator 2 | — | 1.0 | — | 4.0 | — | 4.0 |
| Surfactant 1 | 0.125 | 0.125 | 0.5 | 0.5 | 0.5 | 0.5 |
| Viscosity (centiposie) | — | — | 246 | 218 | 272 | 236 |

After photocure, coatings made from the blends of Examples 13 and 14 were slightly tacky immediately after UV exposure but tack free when cooled to room temperature (about 25° C.). Since both compounds are liquid, i.e., the Monoepoxide and Reactive Diluent, these Examples demonstrate that they cure together under the conditions employed. The other four blends were tack free when warm immediately after UV exposure.

The properties of the coatings are shown in Tables XI and XII.

TABLE XI

| Properties | Example (no post cure) | | | | | |
|---|---|---|---|---|---|---|
| | 13 | 14 | 15 | 16 | 17 | 18 |
| Double Acetone Rubs | 3(4) | 6(5) | 35(4) | 100(2) | 100(3) | 100(2) |
| Pencil | F | HB | F | H | 2H | 2H |
| Hardness | | | | | | |
| Crosshatch Adhesion (%) | 100 | 100 | 100 | 100 | 100 | 100 |
| Gardner Impact, (in lbs.) | | | | | | |
| Face | <5 | <5 | 5-25 | 150 | 25 | 25 |
| Reverse | <5 | <5 | <5 | 75 | <5 | <5 |

TABLE XII

| Properties | Examples (post cured 10 minutes at 170° C.) | | | | | |
|---|---|---|---|---|---|---|
| | 13 | 14 | 15 | 16 | 17 | 18 |
| Double Acetone Rubs | 10(5) | 9(5) | 70(4) | 100(1) | 100(2) | 100(1) |
| Pencil Hardness | HB | F | H | 3H | 3H | 3H |
| Crosshatch Adhesion (%) | 99 | 99 | 100 | 100 | 100 | 100 |
| Gardner Impact, (in lbs.) | | | | | | |
| Face | <5 | <5 | <5 | 150 | 25 | 25 |
| Reverse | <5 | <5 | <5 | 125 | <5 | <5 |

The data in Tables X and XI show that these systems provide hard, brittle coatings with good adhesion, flexibility and solvent resistance which depends upon the ratio of components used and can be varied to achieve desired results. The experiments demonstrate that the Reactive Diluent can be combined with systems containing Monoepoxide and that it lowers the viscosity of the systems.

EXAMPLES 19 TO 22

These Examples describe blends of Monoepoxide, Reactive Diluent, epoxides and photoinitator in the amounts shown in Table XIII.

The blends were coated and cured as described in Examples 1 to 4. The properties of the coatings are shown in Tables XIV and XV.

TABLE XIII

| Ingredient | Examples (Parts by weight) | | | |
|---|---|---|---|---|
| | 19 | 20 | 21 | 22 |
| Monoepoxide | 14.85 | 28.65 | 12.30 | 12.50 |
| Epoxy 1 | 65.80 | — | 54.51 | 54.51 |
| Epoxy 2 | — | 38.20 | 16.39 | 16.34 |
| Reactive Diluent | 14.85 | 28.65 | 12.30 | 12.30 |
| Photo-initiator 1 | — | — | — | 4.0 |
| Photo-initiator 2 | 4.0 | 4.0 | 4.0 | — |
| Surfactant 1 | 0.5 | 0.5 | 0.5 | 0.5 |

TABLE XIV

| Properties | Examples (No past lure) | | | |
|---|---|---|---|---|
| | 19 | 20 | 21 | 22 |
| Double Acetone Rules | 100(1) | 30(5) | 100(1) | 70(4) |
| Pencil Hardness | H | F | H | F |
| Crosshatch Adhesion (%) | 15* | 15* | 20* | 100 |
| Gardner Impact (in. lbs.) | | | | |
| Face | 15 | 25 | 25 | 25 |

TABLE XIV-continued

| | Examples (No past lure) | | | |
|---|---|---|---|---|
| Properties | 19 | 20 | 21 | 22 |
| Reverse | <5 | <5 | <5 | <5 |

*The coatings were very brittle and shattered when the crosshatch test was run. This lead to the apparently low values of adhesion when the tape test was carried out.

TABLE XV

| | Examples (Past Cured 10 min. at 160° C.) | | | |
|---|---|---|---|---|
| Properties | 19 | 20 | 21 | 22 |
| Double Acetone Rubs | 100(1) | 15(4) | 100(1) | 55(4) |
| Pencil Hardness | 3H | H | H | H |
| Crosshatch Adhesion (%) | 100 | 100 | 100 | 100 |
| Gardner Impact (in. lbs.) | | | | |
| Face | 25 | 15 | 25 | 15 |
| Reverse | <5 | <5 | <5 | <5 |

EXAMPLES 23 TO 30

These Examples describe blends of Monoepoxide, epoxide, Reactive Diluent, polyols and photoinitiator in the amounts shown in Table XVI. The ingredients were mixed as described in Examples 1 to 4 and coated onto Bonderite 37 steel panels and cured as described in Examples 1 to 4.

TABLE XVI

| | Example (Parts by Weight) | | | | | | | |
|---|---|---|---|---|---|---|---|---|
| Ingredients | 23 | 24 | 25 | 26 | 27 | 28 | 29 | 30 |
| Epoxy 1 | 43.62 | 4.62 | — | — | 50.57 | 50.75 | — | — |
| Reactive Diluent | 9.84 | 9.84 | 18.10 | 18.10 | 11.40 | 11.40 | 24.24 | 24.24 |
| Epoxy 2 | 13.12 | 12.12 | 24.15 | 24.15 | — | — | — | — |
| Polyol 2 | 19.08 | 19.08 | 35.15 | 35.15 | 22.13 | 22.13 | 47.02 | 47.02 |
| Monoepoxide | 9.84 | 9.84 | 18.10 | 18.10 | 11.40 | 1.40 | 24.24 | 24.24 |
| Photoinitiator 2 | 4.0 | — | 4.0 | — | 4.0 | — | 4.0 | — |
| Photoinitiator 1 | — | 4.0 | — | 4.0 | — | 4.0 | — | 4.0 |
| Surfactant 1 | 0.5 | 0.5 | 0.5 | 0.5 | 0.5 | 0.5 | 0.5 | 0.5 |

Blends 23, 24, 27 and 28 were tack free when warm immediately after UV exposure. The other blends were tacky when warm and when cooled to room temperature. The fact that these latter blends changed from liquids to sticky solids indicates they underwent polymerization. Their character would make them useful as adhesives rather than coatings. Thus, these systems can be used as coatings or adhesives depending on the ratio of formulating ingredients used.

The properties are shown in Tables XVII and XVIII.

TABLE XVII

| | Example (No Thermal Post Cure) | | | | | | | |
|---|---|---|---|---|---|---|---|---|
| Properties | 23 | 24 | 25 | 26 | 27 | 28 | 29 | 30 |
| Acetone Rubs | 80(4) | 60(4) | 4(5) | 4(5) | 80(4) | 70(4) | 2(5) | 2(5) |
| Pencil Hardness | H | H | — | — | H | H | — | — |
| Crosshatch Adhesion (%) | 100 | 100 | — | — | 100 | 100 | — | — |
| Gardner Impact (in. lbs.) | | | | | | | | |
| Face | 25 | 75 | — | — | 25 | 25 | — | — |
| Reverse | <5 | 25 | — | — | <5 | <5 | — | — |

TABLE XVIII

| | Example (Post cured 10 minutes at 160° C.) | | | | | | | |
|---|---|---|---|---|---|---|---|---|
| Properties | 23 | 24 | 25 | 26 | 27 | 28 | 29 | 30 |
| Acetone Rubs | 100(1) | 100(1) | 6(5) | 15(5) | 100(1) | 100(2) | 2(5) | 2(5) |
| Pencil Hardness | H | H | — | 3B | H | H | — | — |
| Crosshatch Adhesion (%) | 100 | 100 | — | 100 | 100 | 100 | — | — |
| Gardner Impact | | | | | | | | |
| Face | 300 | 25 | — | >320 | 25 | 25 | — | — |
| Reverse | 100 | <5 | — | >320 | <5 | <5 | — | — |

EXAMPLES 31 TO 38

These Examples describe blends of Monoepoxide, epoxide, polyol and photoinitiator in the amounts shown in Table XIX. The ingredients were mixed as described in Examples 1 to 4 and coated onto Bonderite 37 steel panels and cured as described in Examples 1 to 4.

TABLE XIX

| | Example (Parts by Weight) | | | | | | | |
|---|---|---|---|---|---|---|---|---|
| Ingredients | 31 | 32 | 33 | 34 | 35 | 36 | 37 | 38 |
| Epoxy 1 | 48.62 | 48.62 | — | — | 57.24 | 57.24 | — | — |
| Reactive Diluent | — | — | — | — | — | — | — | — |
| Epoxy 2 | 14.63 | 14.63 | 29.80 | 29.80 | — | — | — | — |
| Polyol 2 | 21.28 | 21.28 | 43.35 | 43.25 | 25.13 | 25.13 | 63.02 | 63.02 |
| Monoepoxide | 10.97 | 10.97 | 22.35 | 22.35 | 12.95 | 12.95 | 32.48 | 32.48 |
| Photoinitiator 2 | 4.0 | — | 4.0 | — | 4.0 | — | 4.0 | — |
| Photoinitiator 1 | — | 4.0 | — | 4.0 | — | 4.0 | — | 4.0 |
| Surfactant 1 | 0.5 | 0.5 | 0.5 | 0.5 | 0.5 | 0.5 | 0.5 | 0.5 |

The properties of the cured coatings are shown in Tables XX and XXI.

TABLE XX

| | Example (No Thermal Post Cure) | | | | | | | |
|---|---|---|---|---|---|---|---|---|
| Properties | 31 | 32 | 33 | 34 | 35 | 36 | 37 | 38 |
| Acetone Rubs | 100(1) | 100(1) | 8(4) | 6(5) | 100(1) | 100(1) | 2(5) | 2(5) |

TABLE XX-continued

| Properties | Example (No Thermal Post Cure) | | | | | | | |
|---|---|---|---|---|---|---|---|---|
| | 31 | 32 | 33 | 34 | 35 | 36 | 37 | 38 |
| Pencil Hardness | H | H | — | — | H | H | — | — |
| Crosshatch Adhesion (%) | 100 | 100 | — | — | 100 | 100 | — | — |
| Gardner Impact (in. lbs.) | | | | | | | | |
| Face | 25 | 25 | — | — | 25 | 25 | — | — |
| Reverse | <5 | <5 | — | — | <5 | <5 | — | — |

TABLE XXI

| Properties | Example (Post cured 10 minutes at 160° C.) | | | | | | | |
|---|---|---|---|---|---|---|---|---|
| | 31 | 32 | 33 | 34 | 35 | 36 | 37 | 38 |
| Acetone Rubs | 100(1) | 100(1) | 10(4) | 10(4) | 100(1) | 100(1) | 2(5) | 2(5) |
| Pencil Hardness | H | H | — | — | H | H | — | — |
| Crosshatch Adhesion (%) | 100 | 100 | — | — | 100 | 100 | — | — |
| Gardner Impact (in. lbs.) | | | | | | | | |
| Face | >320 | 25 | — | — | >320 | 50 | — | — |
| Reverse | >320 | <5 | — | — | 275 | 25 | — | — |

What is claimed is:

1. A composition suitable for photopolymerization consisting essentially of:
   (a) a cycloaliphatic epoxide containing two or more epoxy groups,
   (b) a hydroxy substituted cycloaliphatic monoepoxide of the formula:

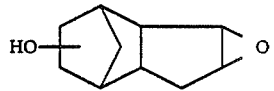

(c) a propylene oxide polyol or polycaprolactone polyol, and
   (d) a photoinitiator.

2. A composition as defined in claim 1 wherein the cycloaliphatic epoxide is 3,4-epoxycyclohexylmethyl-3,4-epoxycyclohexane carboxylate.

3. A composition as defined in claim 1 wherein the cycloaliphatic epoxide is bis(3,4-epoxycyclohexylmethyl)adipate.

4. The photopolymerized product of the composition defined in claim 1.